United States Patent [19]
Webster

[11] Patent Number: 5,864,477
[45] Date of Patent: Jan. 26, 1999

[54] CONVERTER CIRCUIT FOR A POLYPHASE SWITCHED INDUCTIVE LOAD

[75] Inventor: Paul D. Webster, Harrogate, England

[73] Assignee: Switched Reluctance Drives Limited, Harrogate, England

[21] Appl. No.: 844,451

[22] Filed: Apr. 18, 1997

[30] Foreign Application Priority Data

Apr. 19, 1996 [GB] United Kingdom .................. 9608216

[51] Int. Cl.[6] ............................................... H02M 7/5387
[52] U.S. Cl. .............................................. 363/132; 363/56
[58] Field of Search ................................ 363/52, 56, 132

[56] References Cited

U.S. PATENT DOCUMENTS

| 5,172,309 | 12/1992 | De Doncker et al. ................ 363/132 |
| 5,280,421 | 1/1994 | De Doncker et al. .................. 363/98 |
| 5,491,622 | 2/1996 | Carosa ...................................... 363/56 |
| 5,633,793 | 5/1997 | Lee et al. ................................ 363/127 |
| 5,717,584 | 2/1998 | Rajashekara et al. .................... 363/98 |

FOREIGN PATENT DOCUMENTS 0 178 615  4/1986  European Pat. Off. .......... H02P 6/02

OTHER PUBLICATIONS

S. Vukosavic and V. R. Stefanovic, "SRM Inverter Topologies: A Comparattive Evaluation", *Conference Record of the 1990 IEEE Industry Applications Society Annual Meeting*, vol. 2, pp. 946–958, Seattle, Washington, Oct. 7–12, 1990.

V. Ozbulur and M. O. Bilgic, "Simultaion of a C–Dump Switched Reluctance Motor Drive," pp.–338–343, undated.

Tim Miller, "Small Motor Drives Expand Their Technology Horizons," *Power Engineering Journal*, pp. 283–389, Sep. 1987.

Tim Miller, "Brushless Reluctance–Motor Drives," *Power Engineering Journal*, pp. 325–331, Nov. 1987.

C. Pollock and Barry Williams, "A Unipolar Converter for a Switched Reluctance Motor," *IEEE Transactions on Industry Applications*, vol. 26, No. 2, pp. 222–228, Mar./Apr. 1990.

S. Vukosavic and V. R. Stefanovic, "SRM Inverter Topologies: A Comparative Evaluation", *IEEE Transactions on Industry Applications*, vol. 27, No. 6, pp. 1034–1047, Nov./Dec., 1991.

W. F. Ray et al., "High Performance Switched Reluctance Brushless Drives," *Conference Record on Industry Applications Society Annual Meeting*, pp. 1769–1776, 1985.

A. M. Hava et al., "A Modified C–Dump Converter for Variable–Reluctance Machines," *IEEE Transactions on Industry Applications*, vol. 28, No. 5, pp. 1017–1022, Sep./Oct. 1992.

Stephenson and Blake, "The Characteristics, Design and Applications of Switched Reluctance Motors and Drives," PCIM Conference & Exhibition, Jun. 21–24, 1993, Nuremberg, Germany.

*Primary Examiner*—Adolf Deneke Berhane
*Attorney, Agent, or Firm*—Arnold, White & Durkee

[57] ABSTRACT

A converter circuit for an inductive load, such as the phase windings of a switched reluctance motor, uses only n-switches for n-phases. In a four phase machine, each of three of the phases is serially connected with a switch across one voltage source. The remaining phase is serially connected with a switch across another voltage source which receives the inductive energy returned by the other three phases. This returned energy is used to energize the fourth phase. A generator converter is also disclosed in which the energy in the fourth phase is used to provide the excitation for the other three phases.

20 Claims, 4 Drawing Sheets

CONVERTER CIRCUIT FOR A POLYPHASE SWITCHED INDUCTIVE LOAD

BACKGROUND OF THE INVENTION

1. Field of the Invention

This invention relates to a converter circuit for a polyphase switched inductive load. The invention is particularly, though not exclusively, applicable to a converter circuit for a switched reluctance machine.

2. Description of Related Art

FIG. 1 illustrates the basic elements of a typical four-phase switched reluctance machine. It has eight salient poles on the stator and six salient poles on the rotor. Both the stator and the rotor are laminated. Each stator pole carries a simple exciting coil, and opposite coils are connected to form the north and south poles of one 'phase'. Only one phase winding is shown for the sake of clarity, excited from a d.c. supply.

Torque is developed by the tendency of the magnetic circuit to adopt a configuration of minimum reluctance, i.e., for a pair of rotor poles to be pulled into alignment with an excited pair of stator poles, maximizing the inductance of the exciting coils. Continuous rotation (in either direction) is achieved by switching the phases in the appropriate sequence, so that torque is developed continuously in the desired direction. The larger the current supplied to the coils, the greater the torque.

When a pair of rotor poles are fully aligned with a pair of stator poles, the effective air gap between them is at a minimum and the inductance is at a maximum so that the flux linking the coils is also at a maximum for a given current. Excitation of the winding coils creates the magnetic forces that tend to attract the rotor to this orientation of minimum reluctance. By timing and sequencing the switching of each phase as the rotor poles approach pairs of stator poles, continuous rotation of the rotor can be achieved.

Similarly, the same switched reluctance machine can be arranged as a generator by mechanically driving the rotor past the stator poles and timing and sequencing the switching of the coils as the rotor poles are leaving the position of minimum reluctance so that the mechanical work on the rotor is converted into a current flowing in the windings.

A conventional converter circuit is designed to receive a d.c. or rectified mains a.c. supply and to apply it to a load according to a switching strategy. Converters for switched reluctance machines are described in the paper 'The Characteristics, Design and Applications of Switched Reluctance Motors and Drive' by J. M. Stephenson and R. J. Blake delivered at PCIM '93 at Nurnberg, Germany, Jun. 21–24, 1993. This paper discloses the typical two-switches-per-phase circuit shown in FIG. 1. In this kind of converter circuit, the voltage drop across both of the switches is significant when the supply voltage is low, e.g., around 12 volts as would be found in an automotive electrical system.

To reduce the number of switches and yet maintain efficient energy conversion, the so-called 'C-dump' circuit was developed. This uses n+1 switches, where n is the number of phases of the load switched by the converter. One form of the C-dump circuit is illustrated in FIG. 2. The circuit operates by "dumping" stored magnetic energy at the end of a switching cycle into a capacitor ($C_0$ in FIG. 2) which operates at a voltage above the main dc link. To regulate this voltage, a down converter is required ($L_0/D_0/T_0$ in FIG. 2) to return energy to the dc link. It will be appreciated that, even though the C-dump circuit realizes a reduction in the component count over the two-switches-per-phase converter there is still an inductor/diode/switch arrangement that does not contribute to the motor switching function but is essential to the circuit operation as the means to return electrical energy back to the supply.

The C-dump converter circuit and other converter topologies are described in the paper 'A Modified C-Dump Converter for Variable-Reluctance Machines' by A. Hava, V. Blasko and T. A. Lipo, IEEE Transactions on Industry Applications, Vol. 28, No. 5, Sept/Oct 1992, and in the paper 'SRM Inverter Topologies: A Comparative Evaluation' by S. Vukosavic & V. R. Stefanovic, IEEE Trans on Ind. Appl., Vol. 127, No. 6, 1991, p. 1034–47.

In a polyphase switched reluctance machine for a mass-produced article, such as a washing machine, the cost of the switching devices is significant. Therefore, if any further saving on the component count in the converter circuit can be realized, significant cost and space benefits may be achieved.

SUMMARY OF THE INVENTION

It is an object of an embodiment of the present invention to provide a converter circuit which has only one switch for each of the phases of an inductive load. The present invention is defined in the accompanying independent claim. Some preferred features are recited in the dependent claims.

In one form of the invention there is provided a converter circuit for an n-phase inductive load comprising first, second and third electrical junctions, a first voltage source connected between the first and second junctions, a second voltage source connected between the first and third junctions, first switch means actuatable between a conducting and a non-conducting state and being serially connected with each of m (n>m≧1 and m/(n–m)≧2) of the phases of the load, which first switch means and connected phases of the load are connected between the first and second junctions, a first diode connected between each of the m windings and the second voltage source to form a recirculating circuit for current in each of the m windings when each first switch means are open, second switch means actuatable between a conducting and a non-conducting state and being serially connected with the or each of the n–m phases of the load, which second switch means and connected phases of the load are connected between the first and third junctions, and a second diode connected between the or each of the n–m windings and the first voltage source to form a recirculating circuit for current in the or each of the n–m windings when the or each second switch means are open In an embodiment of the invention, the n phases are commonly electrically connected to a first junction. The m phases are electrically connected with a second junction and the n–m phases are connected with a third junction. In this arrangement, the first energy source is connected across the first and second junctions and the second energy source is connected across the first and third junctions.

In effect, embodiments of the invention use the returned (and stored) energy from one group of the phases as a source of energy for the remaining phase(s).

The invention is particularly suited to a four-phase load (or an integer multiple of four phases). For example, the four-phase switched reluctance motor is found typically to function on the basis of a 3:1 ratio of energy used in the phase of a load to that returned to the capacitor in the prior art C-dump circuit. Thus, the use of the invention to supply a fourth one of the phases with the returned energy can provide a balanced arrangement. However, the circuit is also readily applicable to five and six-phase systems.

It will be appreciated that embodiments of the converter circuit of the invention can be used in both power consuming and power generating applications. For example, the circuit can be used with a switched reluctance machine being run as either a motor or a generator.

The invention also extends to a switched reluctance drive incorporating the converter circuit of the invention.

BRIEF DESCRIPTION OF THE DRAWINGS

The invention can be put into practice in various ways some of which will now be described by way of example with reference to the accompanying drawings, in which.

DETAILED DESCRIPTION OF PREFERRED EMBODIMENTS

Figure 3:
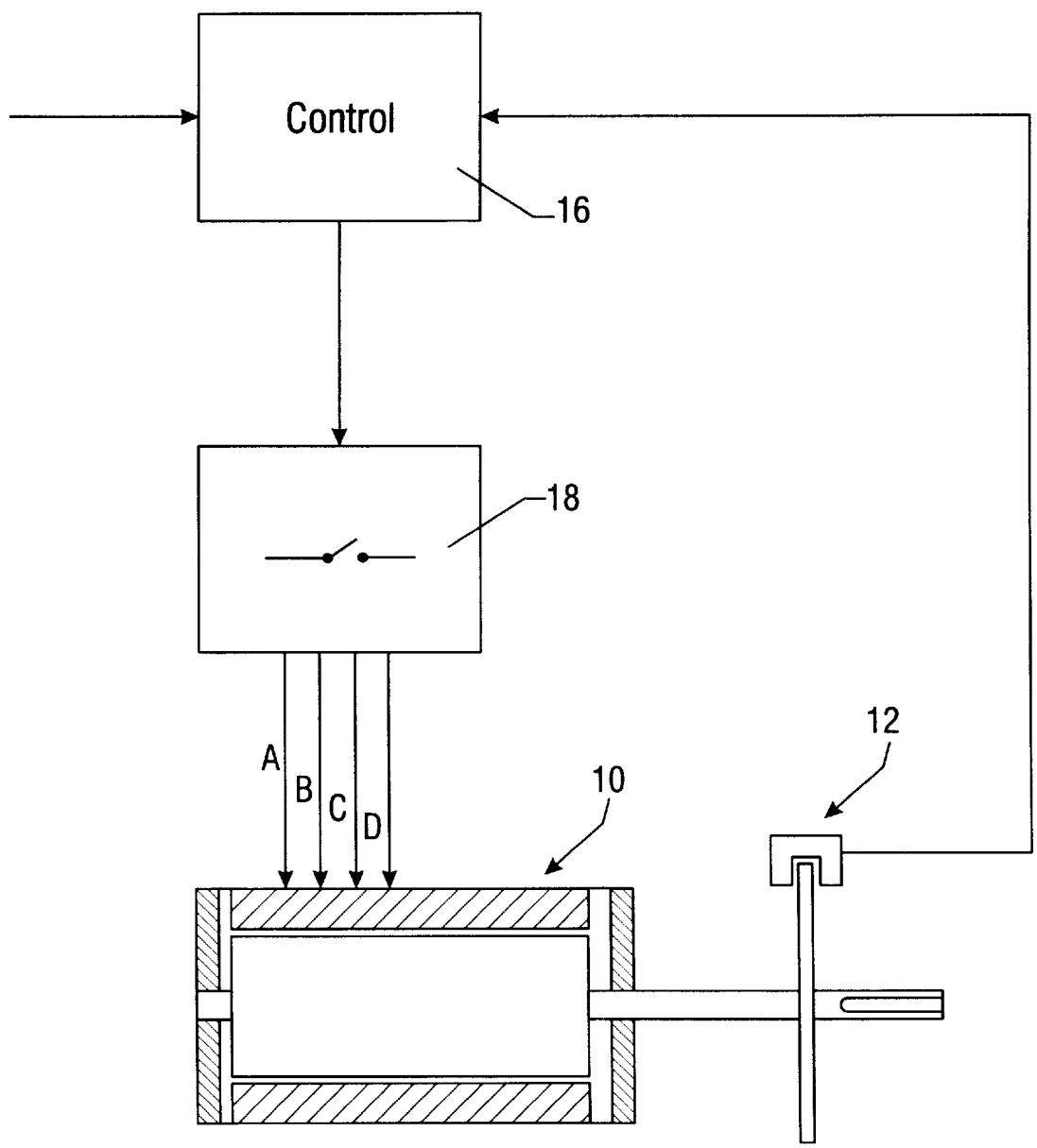
FIG. 3 is a schematic block diagram of a switched reluctance drive system incorporating a converter circuit according to the invention.

FIG. 3 shows generally a switched reluctance drive which comprises an n-phase (in this case four) switched reluctance motor 10 which has a rotor position transducer (RPT) 12 connected with a rotor shaft. The output of the RPT 12 is an indication of the position of the rotor relative to the stator of the motor 10. This output is used as a feedback signal supplied to a controller 16 which governs the actuation of a converter circuit 18 connected to control current in the windings of the motor 10.

Figure 4:
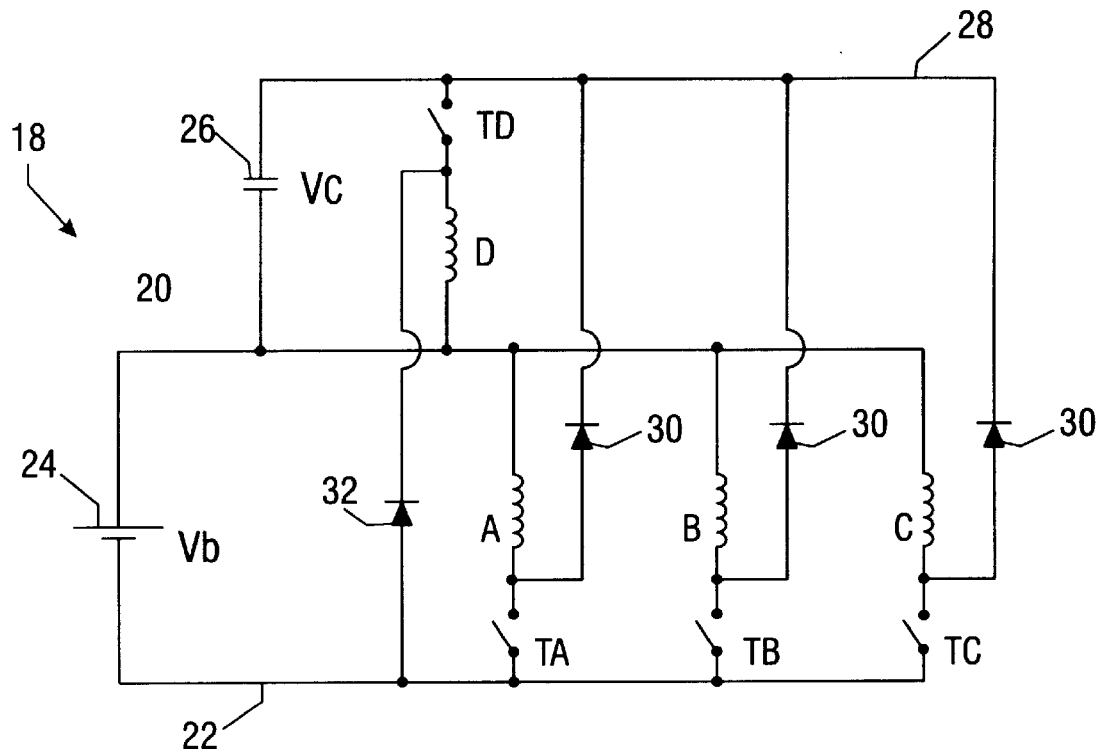
FIG. 4 is a circuit diagram of a converter circuit according to the invention.

The converter circuit according to a first embodiment of the invention is shown in more detail in FIG. 4. It comprises first and second power rails (in this case a positive and a negative power rail) 20/22 which form junctions for the common connection of m (in this case three) of the four phase windings A/B/C of the switched reluctance motor 10, each in series with a power switch TA/TB/TC. A first source 24 of d.c. electrical power is also connected across the power rail 20 and 22 in parallel with the winding/switch pairs of phases A, B and C. The source is typically a battery of at least one electrical cell or a rectified and smoothed alternating voltage source.

A second energy source, in this case a storage capacitor 26, is connected between the first power rail 20 and a further third power rail 28. The remaining n–m (in this case the fourth) of the four phase windings D is connected in series with a further power switch TD such that the winding is connected directly between the first power rail 20 and the third power rail 28 when TD is in its conducting state.

A recirculating diode 30 is connected to conduct from between each phase winding A/B/C and its serially connected power switch TA/TB/TC to the third power rail 28. A further recirculating diode 32 is connected to conduct from the second power rail 22 to between the fourth phase winding D and its associated power switch TD.

Substantially according to known techniques of switched reluctance motor control, the phase windings are energized in sequence according to the movement of the rotor as indicated by the RPT 12. At an appropriate angle of the rotor poles relative to the stator poles, switch TA is closed and the winding of phase A (for example) will be energized as the inductance of the phase is increasing. On opening the switch TA, the inductance of the winding causes a continuing current to flow through the associated diode 30 to the third power rail 28 where it charges the capacitor 26. This action de-energizes the winding of phase A, and transfers stored magnetic field energy to electrical energy in capacitor 26. As each of the switches T associated with the phases A, B and C is turned on and subsequently turned off in timed sequence to promote rotation of the rotor relative to the stator, the returned energy from each phase is transferred to the capacitor 26.

It will be appreciated that a constituent part of the timed switching sequence for a complete cycle of the rotor relative to the stator will include similar actuation of the switch TD associated with the phase winding D. Turning on this switch TD will cause capacitor 26 to discharge through the winding of phase D. Again, when this switch TD is opened, the inductance of the winding of phase D causes the current to recirculate through the d.c. source 24 and the diode 32 as the current decays. Thus, the energy returned to the capacitor 26 from the phase windings A/B/C is usefully exploited to energized the phase winding D.

The invention is particularly suited to a four-phase machine as it is found that in a typical SR drive, the approximate ratio of energy converted to mechanical work by one of the windings to that returned to the capacitor 26 is in the region of 3:1, which is conveniently the ratio of supplied to returned current in the phases A/B/C and phase D, respectively.

Generally, the invention is applicable to an n-phase motor (n>1) in which m phases (n>m≧1 and m/(n−m)≧2) are connected directly to the d.c. supply by means of m switches, and the n−m remaining phase or phases is/are each connected to the third power rail also by means of a single switch.

Figure 1:
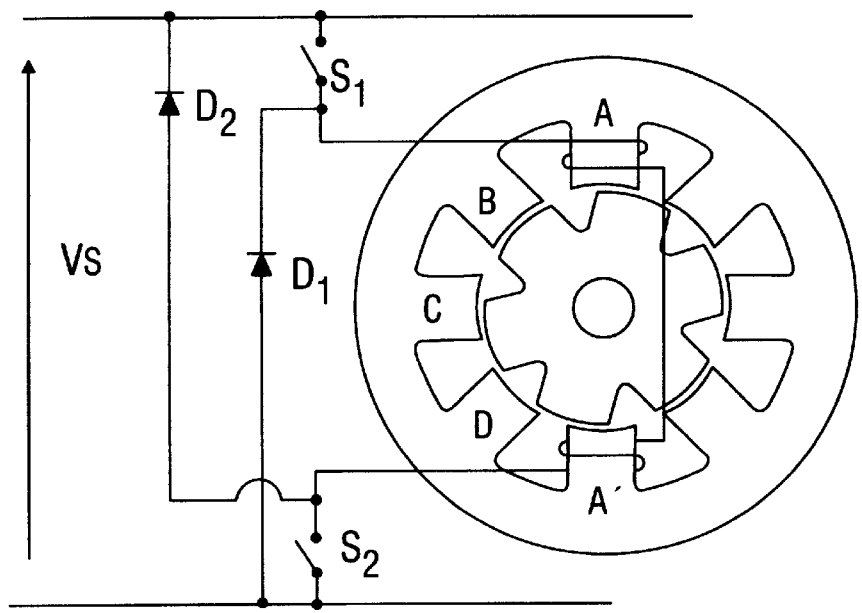
FIG. 1 is a schematic diagram of a prior art switched reluctance machine and converter circuit.
Figure 2:
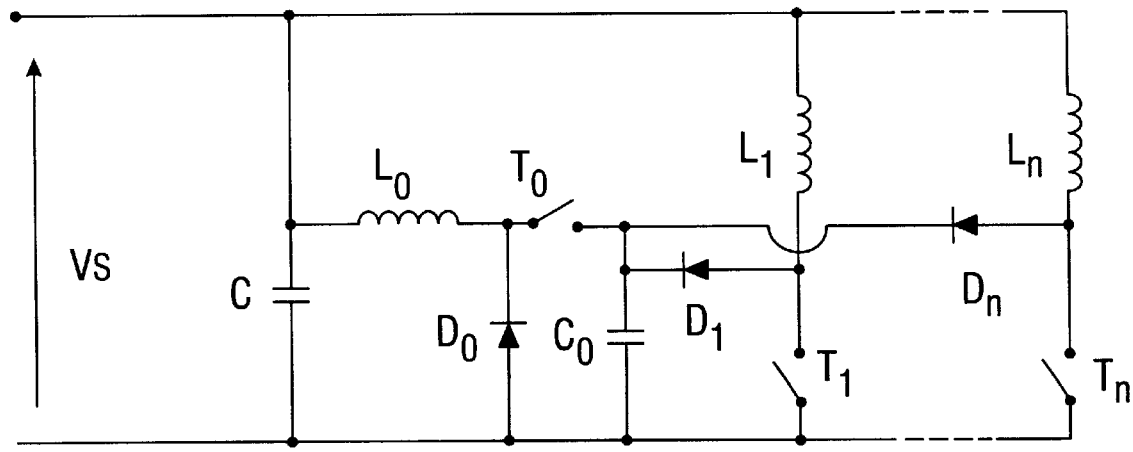
FIG. 2 is a circuit diagram of a conventional C-dump converter circuit for an n-phase switched reluctance machine.

The charge on the capacitor 26 has to be maintained within acceptable upper and lower limits. These limits will depend on the design of the motor and converter and the degree of tolerance of the drive to torque output ripple. It is found that control of the turn-on and turnoff angles of each of the m switches can be varied about the design values to control the amount of charge on the capacitor 26 without appreciably adversely affecting motor performance. For example, a switched reluctance motor based on the machine of FIG. 1 designed to develop 0.25 Nm torque at 4000 rev/min may have an angular rotor pole span of 21 degrees. Typically, at 4000 rev/min the conduction angle is 16 degrees, which, using conventional switching, is begun at 31 degrees before full alignment of rotor and stator poles and is turned off at 15 degrees before full alignment. It is found that switching the same machine as a motor to achieve substantially the same torque output at 4000 rev/min, it is possible to vary the turn-on and turn-off angles by 20% in order to adjust the charge on the capacitor according to the proportion of energy absorbed by the phase windings A/B/C and that passed to the capacitor.

If, during operation of the drive it is found that the voltage $V_c$ is increasing, this indicates that the energy being absorbed by phase D is less than that returned from phases A, B and C to the capacitor 26. The excitation of the machine can be adjusted to vary the amount of energy being returned from each phase and this will bring the voltage $V_c$ back to the desired level. If, on the other hand, the voltage $V_c$, is falling during operation, the excitation of the phase can be altered to deliver more current to the capacitor and hence raise the voltage.

An alternative strategy is to ensure that more energy is supplied to $V_c$, than is used for phase D during the operating cycle. The capacitor voltage can then be controlled by energizing phase D at a time when its inductance is near minimum. Current flowing in the phase at this point of the cycle will produce little or no torque but will serve to reduce the voltage on the capacitor, effectively returning energy to the source 24. This strategy has the advantage that it does not require cycle-by-cycle adjustment of the excitation of the phases, the energy transfer being controlled by a separate piece of logic in the controller.

It will be appreciated by the skilled person that the ratio of converted to returned energy in an SR machine varies with the speed and whether the machine is operated in chopping mode or in single-pulse mode. (These modes of operation are described in the paper by Stephenson et al. referred to above.) The returned energy is greatest at low speeds and in chopping mode. It is therefore possible to adopt a strategy of maintaining the chopping mode to a higher speed than would otherwise be used in order to boost the amount of returned energy. Alternatively, it is possible, at any speed, to introduce a burst of chopping at the front and/or the end of a single-pulse waveform to increase the returned energy.

Figure 5:
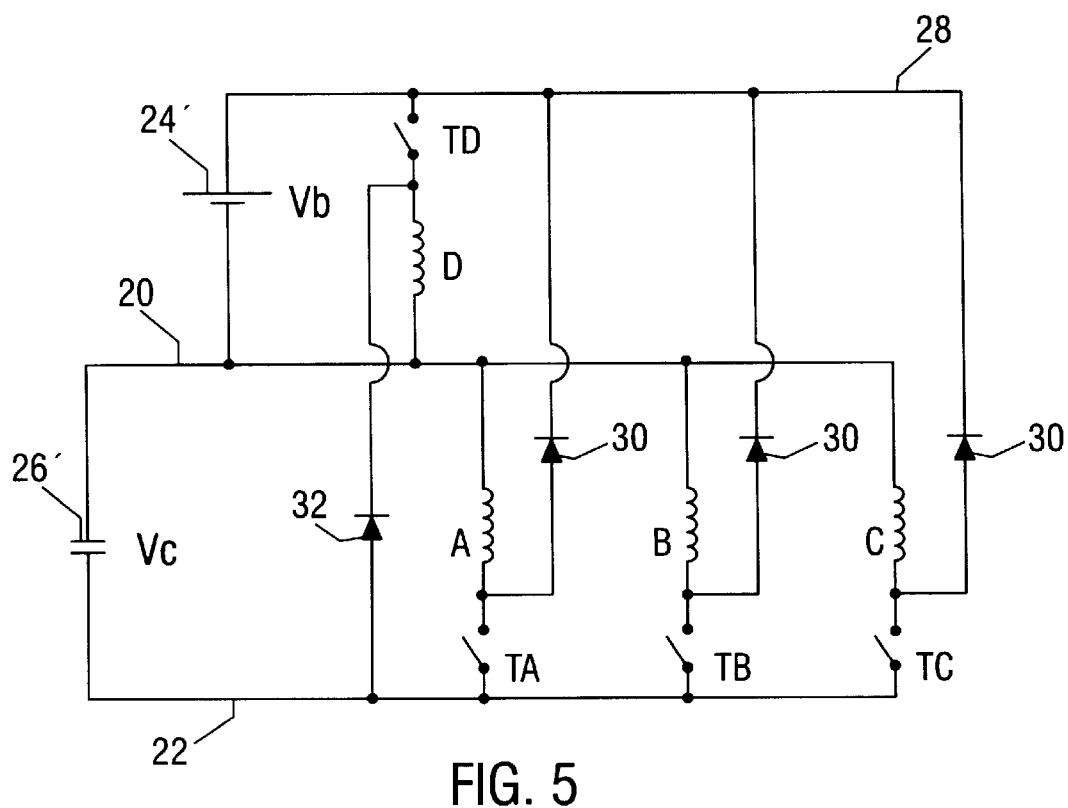
FIG. 5 is a circuit diagram of a second embodiment of the invention arranged for a switched reluctance generator.

A similar circuit can be constructed to control the output of a switched reluctance machine arranged to run as a generator. One form is shown in FIG. 5. The diode and switch arrangements are the same as those in FIG. 4 relative to the power rails and like reference numerals have been used where appropriate. In this arrangement, however, the voltage source 24' and the capacitor 26' replace each other so that the capacitor becomes the first energy source connected between the first and second rails and the battery becomes the second energy source connected between the third and first rails.

It will be appreciated by the skilled person that movement of the rotor in the generating mode and timed, sequential actuation of the switches generates currents in the windings of the switched reluctance machine. Taking phase A (for example), closing its switch TA causes an excitation current to flow from the capacitor 26' through the winding. Opening the switch thereafter, coincident with the generating position of a rotor pole relative to a stator pole, will cause the current generated in the winding of phase A to flow through its diode 30 to the third power rail 28 and to the battery 24' which is thereby charged by the output of phase A of the machine. The circuit between the battery and the phase A winding is completed along the first power rail 20. The same manner of operation applies to phases B and C.

At the point in the rotor cycle where the rotor and stator poles are positioned for the generating cycle of phase D, the associated switch TD connected with the winding of phase D is closed so that an excitation current is taken from the voltage source 24' and passes through the winding D. When the switch is opened, the generated current from the winding flows along the first power rail 20, through the capacitor 26' and the diode 32 for phase D.

In this embodiment, the current generated in the phases A/B/C is used to charge the voltage source 24', and the current generated by the phase D is used to charge the capacitor 26' which can then provide the excitation current for the phases A/B/C. It will be seen that the excitation current required by the phase D winding is derived from the voltage source 24' itself.

Figure 6:
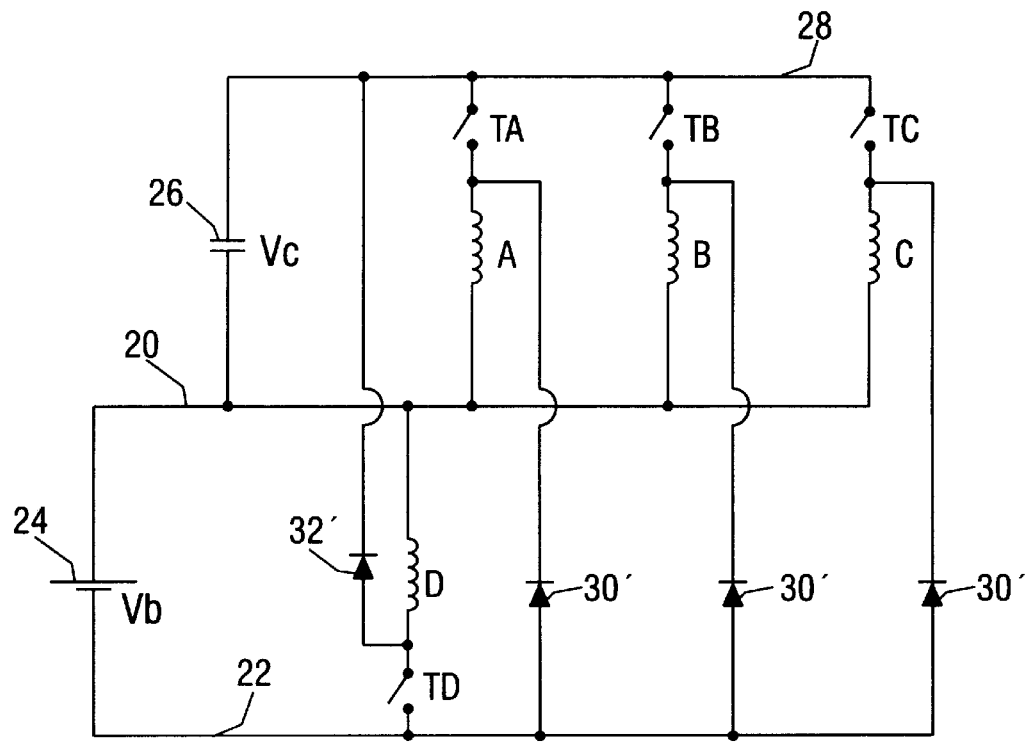
FIG. 6 is a circuit diagram of a third embodiment of the invention also arranged for a switched reluctance generator.

FIG. 6 shows an alternative form of generator converter according to the invention. Again, like reference numerals have been used to denote like parts. In this embodiment, each of the phases A/B/C is serially connected with a corresponding switch TA/TB/TC between the first and third power rails 20/28. The diode 30', for each of the phases A/B/C is connected to conduct from the second power rail 22 to between its corresponding switch TA/TB/TC and winding.

The winding of phase D and its switch TD are serially connected between the first and second power rails 20/22. The diode 32' associated with phase D is connected to conduct from between the switch TD and the winding of phase D to the third power rail 28.

The voltage source 24 is connected between the first and second power rails 20/22, and the capacitor 26 is connected between the first and third power rails 20/28.

In operation in the generating mode, and taking phase A for the purposes of illustration, closing the switch TA according to timing and sequencing as described above, will cause an excitation current to flow through the phase A winding as the capacitor 26 discharges. Thereafter, opening the switch during the generating period of the rotor cycle for phase A creates a current flow from the winding of phase A along the first power rail 20 to charge the voltage source 24, the circuit with the winding being completed by the diode 30' connected between the winding of phase A and the open switch TA. A similar sequence of events occurs in relation to phases B and C in the rotor cycle.

Phase D requires the same general timing. Closing the switch TD of phase D allows excitation current to flow through the phase D winding from the voltage source 24. Thereafter, opening the switch TD diverts current generated in the winding through its diode to charge the capacitor via the third power rail 28.

Figure 7:
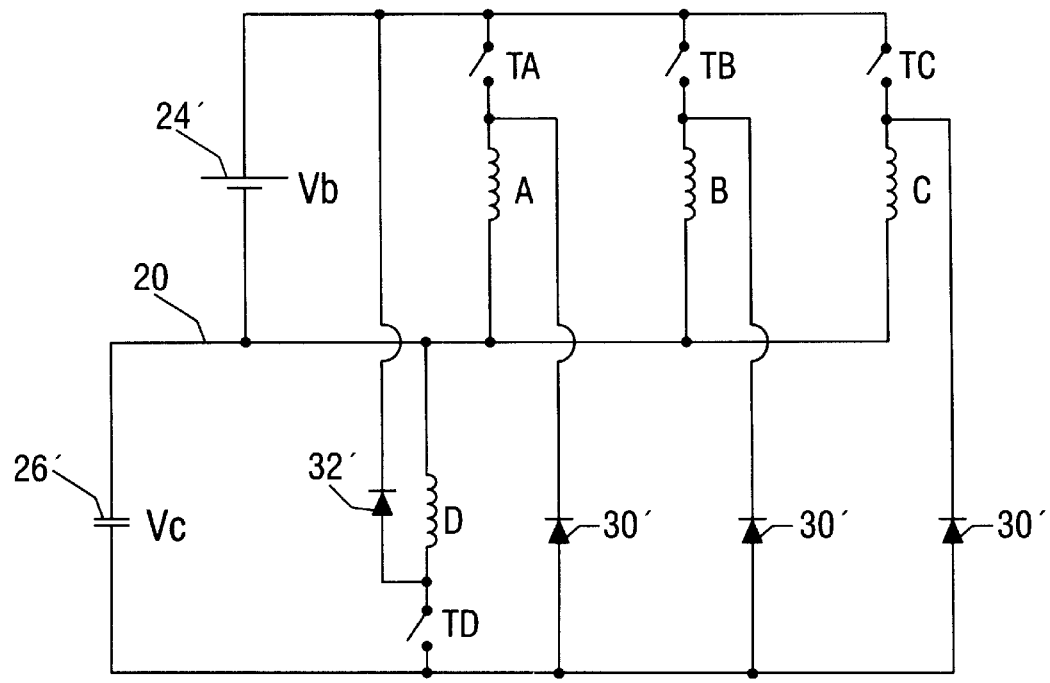
FIG. 7 is a fourth embodiment of the invention arranged for a switched reluctance motor.

It will also be appreciated that this embodiment of the invention can be arranged as a power converter for a motor by swapping over the voltage source (battery) and the capacitor. This arrangement is illustrated in FIG. 7. Like reference numerals have been used to denote like parts. Taking phase A again, when the switch TA is closed in accordance with the timing referred to in relation to FIG. 4, the winding A is supplied with current from the voltage source 24'. Thereafter, opening the switch TA causes current to recirculate to charge the capacitor 26'. The same is true for phases B and C. When the switch for phase D is closed, the winding D is supplied with current from the capacitor 26'. Opening the switch TD diverts the current from the winding to the voltage source 24'.

In each of these embodiments shown in FIGS. 4–7, the battery and capacitor both have a charge/discharge cycle. The difference between the cycles is the duty to which they are subjected. In the motoring mode, the battery is discharged by the phases A/B/C and is charged only by the phase D. The capacitor is charged by the phases A/B/C and discharged only by the phase D. Conversely, in the generating mode the battery is charged by the phases A/B/C and discharged only by the phase D. The capacitor is discharged by the phases A/B/C and charged only by the phase D. Thus, the duties of the battery and the capacitor are similar, but for different purposes in each mode. Therefore, it is possible to consider both the battery and the capacitor alike as energy sources both supplying and absorbing electrical energy during the rotor cycle.

It will be realized by the skilled person that the embodiment of FIG. 4 uses 3 switches with low-side drivers, whereas, e.g., FIG. 6 requires 3 high-side drivers. The skilled person will also appreciate that the switches can be transistor-based, for example bi-polar transistors (such as insulated gate bi-polar transistors), field effect transistors (such as metal oxide silicon field effect transistors) or any other suitably fast switching device capable of handling the power requirements of a particular application.

The invention has been described particularly with reference to a four-phase inductive load. However, it will be appreciated that other polyphase loads can also be switched by means of the converter of the invention.

For example, an eight-phase inductive load may have six phases connected across one chargeable energy source and two phases connected across the other chargeable energy source. Other phase numbers, such as six phases, may also be switched according to the invention. Furthermore, two or more separate converter circuits could be used to switch the same polyphase load. Thus, if it were cost-effective to produce a converter for four phases, an eight-phase inductive load may be switched by using two separate converter circuits each respectively connected to a corresponding four of the phases.

While the invention has been described in connection with the illustrative embodiments discussed above, those skilled in the art will recognize that many variations may be made without departing from the present invention. For example, the invention is equally applicable to linear reluctance machines. The moving member of a linear reluctance machine is often referred to as a rotor. The term 'rotor' used herein is intended to embrace the moving member of such linear machines as well. The present invention is intended to be limited only by the spirit and scope of the following claims.

What is claimed is:

1. A converter circuit for an n-phase inductive electrical load (n>1), comprising a first energy source and m first switch means (n>m≧1 and m/(n−m)≧2) each arranged to control the energization of a corresponding one of a first group of m phases of the load by the first energy source, the circuit further comprising a second energy source and n−m second switch means, the n−m switch means being arranged to control the energization of a corresponding one of a second group of n−m phases by the second energy source to transfer energy in its associated phase of the load to charge the first energy source.

2. A circuit as claimed in claim 1 in which each of the first and second switch means include a switch device which is serially connected with its associated phase of the load.

3. A circuit as claimed in claim 2, further including first, second and third electrical junctions, in which the n−m serially connected pairs of the switch device of the second switch means and the associated phase are connected between the first and the third electrical junctions, and each of the m serially connected pairs of the switch device of the first switch means and the associated phase are connected between the first and the second electrical junctions and the first energy source is connected across the first and second electrical junctions.

4. A circuit as claimed in claim 2 in which the second energy source is connected across the first and third electrical junctions, and in which a first diode is connected to conduct from each of the m phases to the second energy source when the associated first switch means are open.

5. A circuit as claimed in claim 2 in which each of the n−m second switch means also include a second diode connected to conduct to each of the n−m phases from the first energy source when the switch device of that phase is opened.

6. A circuit as claimed in claim 1 in which the first energy source is a battery.

7. A circuit as claimed in claim 1 in which the second energy source is a capacitor.

8. A converter circuit as claimed in claim 1 further comprising: first, second and third electrical junctions, the first energy source being connected between the first and second junctions and the second energy source being connected between the first and third junctions, the first switch means being serially connected with each of the m phases of the load, which first switch means and m phases are connected between the first and second junctions and the second switch means being serially connected with the n−m phases of the load, which second switch means and n−m phases are connected between the first and third junctions; the circuit further comprising first diodes each connected between each of the m phases and the third junction; and at least one second diode, the second diode being connected between the n−m phases and the second junction.

9. A circuit as claimed in claim 8 in which: each of the n phases is connected directly with the first junction; the first switch means are connected with the second junction; the second switch means are connected with the third junction; each first diode is connected to conduct toward the third junction; and the second diode is connected to conduct from the second junction.

10. A circuit as claimed in claim 8 in which: each of the n phases is connected directly with the first junction; the first switch means are connected with the second junction; the second switch means are connected with the third junction; each first diode is connected to conduct from the third junction; and the second diode is connected to conduct towards the second junction.

11. A circuit as claimed in claim 1 in which n is 4 and m is 3.

12. A switched reluctance drive comprising a switched reluctance machine having a rotor, a stator and n phase windings (n>1), means for generating a signal indicative of the position of the rotor relative to the stator, a converter circuit as claimed in claim 1, and control means responsive to an input demand signal and the signal indicative of rotor position for actuating the switch means of the converter circuit.

13. A switched reluctance drive as claimed in claim 12 in which the control means are operable to run the machine as a motor.

14. A switched reluctance drive as claimed in claim 12 in which the control means are operable to run the machine as a generator.

15. A converter for an inductive load having N phases, where N is an integer greater than 2, the converter circuit comprising:
   a first energy source;
   a second energy source;
   M first switching devices that may be actuated to couple a first subset of the N phase windings to the first energy source, where M is an integer less than N and greater than or equal to 1, and where M/(N−M) is greater than or equal to two; and
   N−M second switching devices that may be actuated to couple a second subset of the N phase windings to the second energy source to transfer energy from a phase winding in the second subset of the N phase windings to the first energy source.

16. The converter of claim 15 wherein the second energy source is a capacitor.

17. The converter of claim 15 wherein N is 4 and M is 3.

18. A system including:

an inductive load having N phases;

a first energy source;

a second energy source;

M switches coupled to a first subset of the N phases that may be actuated to couple the first subset to the first energy source, where M is an integer less than N and greater than or equal to 1, and where M/(N–M) is greater than or equal to two; and N–M switches that may be actuated to couple a second subset of the N phase windings to the second energy source to transfer energy from a phase winding in the second subset of the N phase windings to the first energy source.

19. The system of claim 18 wherein the inductive load having N phases is a switched reluctance machine.

20. The system of claim 18 wherein the second energy source is a charged capacitor.

* * * * *